Dec. 5, 1967             P. R. BAGBY             3,356,397
WIRE ROPE LONG SPLICE AND METHOD OF MAKING
Filed May 7, 1965
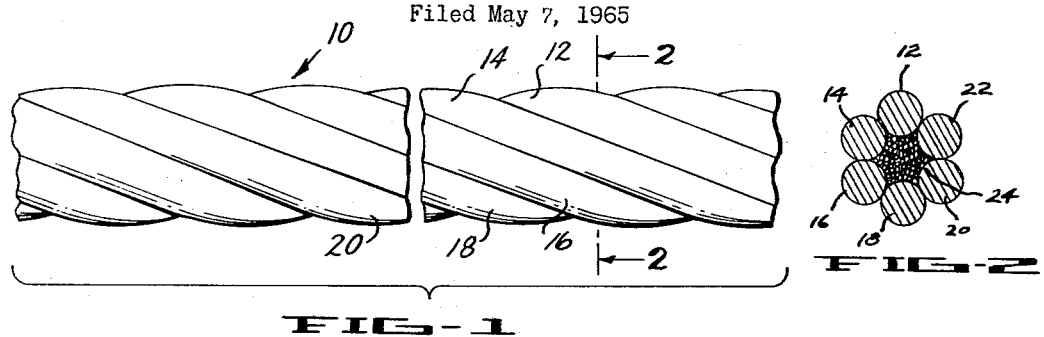
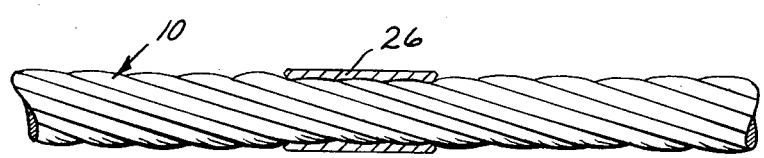
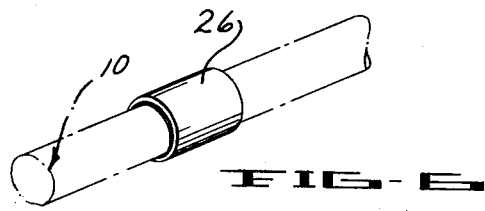
INVENTOR.
PERCY R. BAGBY
BY *Fulwider, Patton, Rieber,*
*Lee & Utecht*
ATTORNEYS 3,356,397
WIRE ROPE LONG SPLICE AND
METHOD OF MAKING
Percy R. Bagby, 27844 Conestoga Drive,
Rolling Hills, Calif. 90274
Filed May 7, 1965, Ser. No. 453,950
2 Claims. (Cl. 287—78)

The present invention relates to a wire rope pressed sleeve splice and to a method of making such a splice.

A common method of splicing wire rope is the "long splice" in which the two rope ends to be spliced are overlapped a predetermined length and the complemental strands of the rope ends are severed at longitudinally-spaced points. The conventional wire rope includes a core, and this core must be removed in the area adjacent the abutting ends of each pair of complemental strands in order to make the long splice. Each one of the severed ends is secured in position by tucking it into one of the open spaces formed by the removal of the fiber core. As many strand splices are formed as there are strands, and all of these splices constitute the long splice for the wire rope proper.

The prior art procedure for forming the long splice is a tedious and time-consuming operation, particularly that part of the operation in which the rope core is removed and replaced by the tucked ends of each complemental pair of strands in the rope. In addition, the procedure requires highly-skilled, experienced workmen, who may not readily be available when a wire rope unexpectedly parts. Nevertheless, this method of repairing wire rope has been used for many years because of certain advantages. That is, the strength of the wire rope is largely retained, losing only perhaps twenty percent because of the splice. This is apparently due to the appreciable length of the splice area which in a one-inch diameter rope may be 33 feet, with a 33-inch tuck for each of the strands. This length of splice provides a relatively large area of interengagement between the tucked strands and the adjacent strands so that the latter can exert a powerful clamping action and prevent the spliced ends from parting. In addition, the long splice is advantageous because the diameter of the wire rope in the splice area is not appreciably increased. This in an important consideration in situations where the wire rope is, for example, formed into an endless loop for passage about sheaves and the like.

Accordingly, it is an object of the present invention to provide a method of long splicing the ends of a wire rope without the use of tucks while yet providing substantially the same tensile strength as the conventional, tucked long splice.

Another object of the invention is to provide a method of long splicing which can be quickly and easily accomplished by workmen having only a relatively rudimentary background in wire rope splicing techniques.

Another object of the invention is to provide a method of splicing the ends of a wire rope and which utilizes a plurality of pressed sleeves disposed about the rope. Each sleeve is applied to a strand splice and, by virtue of the number of such strand splices, the diameter and length of each sleeve can be reduced sufficiently so as not to interfere with movement of the wire rope about sheaves or similar structure.

Another object of the invention is to provide a method of splicing or repairing a single damaged strand of a wire rope by pressing a sleeve about the damaged area.

Still another object of the invention is to provide a method of splicing a wire rope of that type having only circumferentially-arranged strands and no central core.

The present method is not limited to use with any particular length, diameter, number of strands, number of wires per strand, wire arrangement, lay direction, lay type, type of core, or the like, and is applicable to the splicing or repair of wire ropes in general, as will be seen.

Other objects and features of the invention will become apparent from consideration of the following description taken in connection with the accompanying drawings, in which:

FIG. 1 is an elevational view of an exemplary short section of wire rope having six circumferentially arranged strands and a central fiber core, the rope section being shown parted in the middle;

FIG. 2 is a transverse cross-section taken along the line 2—2 of FIG. 1;

FIG. 3 is a diagrammatic showing of the six strands of the wire rope of FIG. 1, illustrating the longitudinally spaced arrangement of the six splices over the splice length, the proximity of the splices being exaggerated so as to fit the drawing area;

FIG. 4 is an elevational view of a wire rope having six sleeves pressed about the rope to provide six splices longitudinally spaced along the splice length, the proximity of the splices being exaggerated to conform to the showing in FIG. 3;

FIG. 5 is an enlarged longitudinal cross-sectional view of one of the sleeves of FIG. 4, the sleeve being illustrated after it is pressed in position upon the wire rope; and FIG. 6 is a perspective view, on a reduced scale, of the sleeve of FIG. 5.

Referring now to the drawings, there is illustrated a conventional type of wire rope 10 having six outer strands 12, 14, 16, 18, 20 and 22 which are circumferentially arranged about a central fiber core 24. To facilitate the description which follows, the strands 12 through 20 of the rope end located to the left are designated $a$, while those in the rope end located to the right are designated $b$, as best viewed in FIGS. 1 and 3.

The wire rope 10 is merely exemplary and it will be understood that various other types of wire rope are equally suited for repair by use of the method and splice of the present invention.

According to the present method, the parted wire rope 10 is spliced by overlapping the rope ends a predetermined length sufficient to closely approach or equal the rated strength of the rope. In a one-inch rope this distance would be aproximately 33 feet. This overlap constitutes the splice area, and the individual strands are next severed, unlaid, and relaid in a particular manner to form the long splice. More particularly, ferrules or sleeves 26 are slid or threaded over the rope end to the left, out of the way of the splice area. Next, the strand 12$a$ is unlaid from its rope end approximately the full length of the overlapped portion or splice length and severed. The corresponding strand 12$b$ is then unlaid from its rope end and laid in the open groove formed in the first rope end by the removal of the strand 12$a$. The strands 12$a$ and 12$b$ are then in end-abutting relation to define a splice joint. The fiber core 24 is preferably then severed the length of the strand 12$a$ and the remaining core ends are abutted.

One of the sleeves 26 is next arranged about the adjacent pair of strands 12$a$ and 12$b$ and swaged or compressed over these strands. This also compresses the remaining strands of the rope end located on the left, as best seen in FIG. 3, and also compresses the core ends.

The tubular ferrules or sleeves 26 are made of any suitable high-strength material capable of cold flow under pressure into the wire and strand interstices of the rope ends. A sleeve of such material thus becomes an integral part of the rope and is capable of great holding power. Stainless steel is a preferred material because of its high strength and resistance to corrosion. High strength is desirable because it enables the use of relatively short, thin wall sleeves which facilitate movement of the rope about sheaves and the like. Preferably, the sleeve is kept below approximately twice the rope diameter, the sleeve lengthening somewhat during swaging. In this regard, it is noted that the swaging action compresses the wire rope, reducing its diameter somewhat, and also desirably reduces the thickness of the sleeve wall. In the example of the one-inch wire rope, the sleeve thickness is initially on the order of one-quarter inch when using stanless steel, that is, one-fourth the diameter of the wire rope. The finished diameter of the sleeve and rope would therefore be about one and one-eighth inches. Of course, the sleeve length and wall thickness will vary according to the wire rope diameter and type and the particular application for the wire rope.

The equipment for swaging such sleeves in position will not be described since suitable apparttus is well known to those skilled in the art.

After the strands 12a and 12b are sleeve-swaged together, the strand 14a is then severed at a point longitudinally spaced from the first splice but within the overlap or splice length. The strand 14b is then unlaid from its rope end and laid in the open groove formed by the removal of the strand 14a from the other rope end. The strand 14b is next severed to locate its severed end adjacent and in abutting relationship to the severed end of the strand 14a.

Another sleeve 26 is located about the adjacent pair of strands 14a and 14b and swaged in position. This particular sleeve 26 also passes about the strands 12b, 16a, 18a, 20a and 22a, as indicated in FIG. 3.

Next, the strand 16a is severed within the splice length and at a point longitudinally spaced from the last splice. The corresponding strand 16b is laid in the open groove formed by the removal of the strand 16a and is severed to locate its severed end in abutting relation to the severed end of the strand 16a. Another sleeve 26 is pressed about the abutting ends of the strands 16a and 16b, as will be apparent.

The operation is repeated with the strands 18a and 18b, the strands 20a and 20b, and the strands 22a and 22b to provide the six splices illustrated in FIGS. 3 and 4. The six splices are illustrated in rather close proximity to enable their illustration in the space available. In actual practice the splices are located over a relatively long splice length, the length being approximately 33 feet for a one-inch wire rope, for example. Each splice is approximately six lays from the next splice.

The six splices constitute a long splice capable of carrying a load approaching or equaling the full rated strength of the wire rope, each of the sleeves developing approximately one-sixth of the load. Because the strength of the long splice is distributed over the six splice points, the cross section and length of each sleeve 26 can be reduced to a minimum. The use of the sleeves 26 thus provides a relatively quick and inexpensive means for long splicing wire rope. Tucks are completely eliminated. As a matter of fact, the present method can be used for splicing wire rope having no core, whereas the luck of a core greatly complicates present splicing practices since there is then no central core void within which to make tucks.

The point of abutment of the fiber core ends is not critical but preferably falls within one of the sleeves.

A single sleeve 26 can also be used to repair a single damaged strand by compressing the sleeves about the rope at the point of damage.

Various modifications and changes may be made with regard to the foregoing detailed description without departing from the spirit of the invention or the scope of the following claims.

I claim:

1. A long splice for the severed strands of a wire rope and adapted for passage about a sheave or the like, said long splice comprising: complemental pairs of the severed strands of the rope ends arranged in abutting relation to define splice joints, the abutting ends of each of said pairs being axially spaced from the abutting ends of the others of said pairs whereby said splice joints are axially spaced along said wire rope;

and a plurality of sleeves pressed upon said rope and about all of said strands, said sleeves being axially spaced to locate a separate one of said sleeves about each of said splice joints, the length of each said sleeve being approximately twice the diameter of said wire rope, the wall thickness of each said sleeve being not more than approximately one-fourth the diameter of said wire rope, and the axial spacing between adjacent ones of said splice joints being such that, upon passage of said long splice portion of said wire rope about a usual sheave, the section of said wire rope between adjacent said sleeves engages upon the periphery of the sheave.

2. A long splice according to claim 1 wherein each of said sleeves is axially spaced from the adjacent one of said sleeves approximately six lays.

References Cited
UNITED STATES PATENTS

| | | | |
|---|---|---|---|
| 2,052,958 | 9/1936 | Webb | 287—78 |
| 2,461,079 | 2/1949 | Peterson et al. | 57—142 |
| 2,482,204 | 10/1949 | Peterson | 57—142 |
| 2,566,262 | 8/1951 | Traxler | 156—49 |
| 2,789,931 | 4/1957 | Blue | 156—49 |
| 2,882,333 | 4/1959 | Bertaux | 287—78 X |
| 2,943,434 | 7/1960 | Joy et al. | 57—142 |

CARL W. TOMLIN, *Primary Examiner.*

W. L. SHEDD, T. A. LISLE, *Assistant Examiners.*